US012349675B2

(12) United States Patent
Veleva

(10) Patent No.: US 12,349,675 B2
(45) Date of Patent: Jul. 8, 2025

(54) COLLOIDAL PARTICLE FORMULATIONS WITH ADVANCED FUNCTIONALITY

(71) Applicant: BENANOVA INC., Cary, NC (US)

(72) Inventor: Anka Veleva, Cary, NC (US)

(73) Assignee: BENANOVA INC., Cary, NC (US)

( * ) Notice: Subject to any disclaimer, the term of this patent is extended or adjusted under 35 U.S.C. 154(b) by 0 days.

(21) Appl. No.: 17/247,808

(22) Filed: Dec. 23, 2020

(65) Prior Publication Data

US 2021/0244022 A1 Aug. 12, 2021

Related U.S. Application Data

(60) Provisional application No. 62/975,288, filed on Feb. 12, 2020.

(51) Int. Cl.

| | |
|---|---|
| ***A01N 25/22*** | (2006.01) |
| ***A01N 25/04*** | (2006.01) |
| ***A01N 25/10*** | (2006.01) |
| ***A01N 59/20*** | (2006.01) |
| ***C07G 1/00*** | (2011.01) |
| ***C08L 97/00*** | (2006.01) |

(52) U.S. Cl.

CPC ............. *A01N 25/22* (2013.01); *A01N 25/04* (2013.01); *A01N 25/10* (2013.01); *A01N 59/20* (2013.01); *C07G 1/00* (2013.01); *C08L 97/00* (2013.01); *C08L 97/005* (2013.01)

(58) Field of Classification Search

CPC ........ A01N 25/10; A01N 25/04; A01N 59/20; C08L 97/00; C08L 97/005; C07G 1/00

See application file for complete search history.

(56) References Cited

U.S. PATENT DOCUMENTS

| | | | | |
|---|---|---|---|---|
| 5,049,661 | A * | 9/1991 | Dilling | C08H 6/00 530/500 |
| 10,278,395 | B2 | 5/2019 | Velev et al. | |
| 11,311,010 | B2 * | 4/2022 | Wurm | A01N 25/04 |
| 2005/0206022 | A1 * | 9/2005 | Pellikaan | B01J 2/04 264/11 |
| 2014/0061026 | A1 | 3/2014 | Gerlinger et al. | |
| 2014/0256545 | A1 | 9/2014 | Velev et al. | |
| 2015/0093424 | A1 | 4/2015 | Lapitsky et al. | |
| 2017/0303532 | A1 | 10/2017 | van der Krieken et al. | |
| 2018/0028431 | A1 * | 2/2018 | Chiattello | A01N 25/34 |
| 2019/0281833 | A1 | 9/2019 | Velev et al. | |
| 2020/0071468 | A1 * | 3/2020 | Friedl | C08H 6/00 |

FOREIGN PATENT DOCUMENTS

| | | | | |
|---|---|---|---|---|
| WO | WO-2012013895 A1 * | 2/2012 | | A61K 45/06 |

OTHER PUBLICATIONS

Hamano, Biosci. Biotechnol. Biochem., 75(7), 2011, 1226-1233.*
Li et al., Environ. Sci. Technol., 2010, 44, 19, 7561-7568.*
Zoutman Industries Safety Data Sheet: Sodium Chloride, 7 pages, 2015.*
Dai et al., "Carbon Nanomaterials for Advanced Energy Conversion and Storage", Small, vol. 8, No. 8, pp. 1130-1166, 2012.
Luo et al., "Chemical Approaches toward Graphene-Based Nanomaterials and their Applications in Energy-Related Areas", Small, vol. 8, No. 5, pp. 630-646, 2012.
Chen et al., "Nanomaterials for renewable energy production and storage", Chem Soc Rev, vol. 41, pp. 7909-7937, 2012.
Zuttel et al., "Hydrogen Storage in Carbon Nanostructures", International Journal of Hydrogen Energy, vol. 27, pp. 203-212, 2002.
Liu et al., "Oriented Nanostructures for Energy Conversion and Storage", Chem Sus Chem, vol. 1, pp. 676-697, 2008.
Lee et al., "Nanomaterials in the Construction Industry: A Review of Their Applications and Enviromental Health and Safety Considerations", ACS Nano, vol. 4, No. 7, pp. 3580-3590, 2010.
Sobolev et al., "How Nanotechnology Can Change the Concrete World", American Ceramic Society Bulletin, vol. 84, No. 11, pp. 16-19, 2005.
Li, Gengying, "Properties of high-volume fly ash concrete incorporating nano-SiO2", Cement and Concrete Research, vol. 34, pp. 1043-1049, 2004.
Qu et al., "Applications of nanotechnology in water and wasterwater treatment", Water Research, vol. 47, pp. 3931-3946, 2013.
Qu et al., "Nanotechnology for a Safe and Sustainable Water Supply: Enabling Integrated Water Treatment and Reuse", Accounts of Chemical Research, vol. 46, No. 3, pp. 834-843, 2013.
Bae et al., "Effect of TiO2 nanoparticles on fouling mitigation of ultrafiltration membranes for activated sludge filtration", Journal of Membrane Science, vol. 249, pp. 1-8, 2005.
Paret et al., "Photocatalysis: Effect of Light-Activated Nanoscale Formulations of TiO2 on Xanthomonas perforans and Control of Bacterial Spot of Tomato", Phytopathology, vol. 103, No. 3, pp. 228-236, 2013.
Strayer-Scherer et al., "Advanced Copper Composites Against Copper-Tolerant *Xanthomonas perforans* and Tomato Bacterial Spot", Phytopathology, vol. 108, pp. 196-205, 2018.
Liao et al., "Nano-Magnesium Oxide: A Novel Bactericide Against Copper-Tolerant *Xanthomonas perforans* causing Tomato Bacterial Spot", Phytopathology, vol. 109, No. 1, pp. 52-62, 2019.
Beik et al., "Gold nanoparticles in combinatorial cancer therapy strategies", Coordination Chemistry Reviews, vol. 387, pp. 299-324, 2019.
Amiri et al., "Magnetic nanocarriers: Evolution of spinel ferrites for medical applications", Advances in Colloid and Interface Science, vol. 265, pp. 29-44, 2019.
Ling et al., "Assessing the potential exposure risk and control for airborne titanium dioxide and carbon black nanoparticles in the workplace", Environo Sci Pollut Res, vol. 18, pp. 877-889, 2011.

(Continued)

*Primary Examiner* — Kyle A Purdy
(74) *Attorney, Agent, or Firm* — McKee, Voorhees & Sease, PLC

(57) ABSTRACT

Disclosed is a method for creating a composite colloidal particle formulation with advanced functionality that possesses highly efficient and effective properties. The composite colloidal particle formulation comprises an engineered biodegradable particle core dispersed in a bioadhesive polyelectrolyte solution. Also disclosed are methods of use of the same, including but not limited to applying said formulation to plants for disease treatment.

13 Claims, 17 Drawing Sheets

(56) References Cited

OTHER PUBLICATIONS

Lam et al., "A Review of Carbon Nanotube Toxicity and Assessment of Potential Occupational and Environmental Health Risks", Critical Reviews in Toxicology, vol. 36, pp. 189-217, 2006.
Lora et al., "Recent Industrial Applications of Lignin: A Sustainable Alternative to Nonrenewable Materials", Journal of Polymers and the Environment, vol. 10, Nos. 1/2, pp. 39-48, Apr. 2002.
Klein et al., "Natural biopolymer-based hydrogels for use in food and agriculture", J Sci Food Agriculture, vol. 100, pp. 2337-2340, 2020.
Robertson et al., "[Fe(Htrz)2(trz)](BF4) nanoparticle production in a milli-scale segmented flow crystalliser", Flow Chemistry, pp. 1-3, Mar. 2017.
International Searching Authority in connection with PCT/US20/66884 filed Dec. 23, 2020, "The International Search Report and the Written Opinion of the International Searching Authority, or the Declaration", 9 pages, mailed Mar. 15, 2021.
Zou et al., "Natural Shape-Retaining Microcapsules With Shells Made of Chitosan-Coated Colloidal Lignin Particles," Frontiers in Chemistry, May 2019, vol. 7, 12 pages.
Extended European Search Report in EP20918173.4, mailed Feb. 27, 2024, 9 pages.

* cited by examiner

COLLOIDAL PARTICLE FORMULATIONS WITH ADVANCED FUNCTIONALITY

CROSS-REFERENCE TO RELATED APPLICATION

This application claims priority under 35 U.S.C. § 119 to Provisional Applications U.S. Ser. No. 62/975,288, filed on Feb. 12, 2020, which is herein incorporated by reference in its entirety including without limitation, the specification, claims, and abstract, as well as any figures, tables, or examples thereof.

STATEMENT REGARDING FEDERAL SPONSORSHIP

This invention was made with Government support under grant No NSF1746692 awarded by the National Science Foundation. The Government has certain rights in this invention.

1. FIELD OF THE INVENTION

The field of the invention relates to creating a composite colloidal particle formulation with advanced functionality that possesses highly efficient and effective properties. The composite colloidal particle formulation comprises an engineered biodegradable particle core dispersed in a bioadhesive polyelectrolyte solution. Also disclosed are methods of use of the same.

2. BACKGROUND OF THE INVENTION

Colloidal micro- and nano-particle composite formulation products have the potential to solve problems in a wide range of economic sectors such as energy production and storage [1-5], construction [6-8], environmental remediation [9-11], agriculture [12-14] and healthcare [15, 16] among others. Because of their small size and large surface area to mass ratio, colloidal particles offer the opportunity to produce new structures and material composite formulations with unique physicochemical properties and function. Despite the great potential economic and industrial impact, possible environmental, health and safety risks associated with the use of various synthetic inorganic micro- and nano-particles and concerns of post-utilization persistence have limited their widespread application [17, 18]. Some of these problems can be mitigated largely by utilizing biorenewable and biodegradable feedstock biopolymers such as cellulose, hemicellulose, lignocellulose or lignin to engineer biodegradable particle formulations with advanced performance properties and functionality. In the environment, these plant-derived biopolymer formulations are broken down post-utilization by microorganisms into carbon dioxide and water. Because the released carbon dioxide can be captured back by plants, this makes them environmentally friendly and sustainable.

Lignin is the most abundant terrestrial aromatic biopolymer [19]. Lignin plays a vital role in plant health, growth and development by providing structural integrity of the cell wall of the plant. Upon processing of plant biomass lignin structure undergoes changes depending on the processing method. For example, the most common extraction method of lignin widely used in the pulp and paper industry is the Kraft pulping process. The lignin recovered from this process is called Kraft lignin. During Kraft processing, sulfur-containing groups are added to modify its structure and composition. Kraft lignin provides an example of sulfonated lignin. Another industrial process uses "organosolv" extraction, and the resulting lignin is known as Organosolv lignin. Organosolve lignin has a final structure close to its natural form, does not contain sulfur, and is highly hydrophobic.

Another class of sustainable materials used in a variety of industries comprises of natural polyelectrolytes. Polyelectrolytes are charged molecules and can be anionic or cationic. Polyelectrolytes play a fundamental role in determining structure, stability and the interactions of various colloidal formulations. In addition, the presence of polyelectrolytes in a formulation can make the system bioadhesive. Polysaccharides (such as chitosan and other natural carbohydrates), polypeptides, lectins, proteins and antibodies represent examples of bioadhesive polyelectrolyte systems [20].

Solanaceae is mainly a tropical family of about 75 genera and 2000 species. The more important vegetable genera are *Solanum* (potato and eggplant), *Lycopersicon* (tomato), and *Capsicum* (pepper). The Solanaceae, widely known as the nightshade family, also includes some poisonous alkaloid-containing species such as *belladonna* (*Atropa belladonna*), mandrake (*Mandragora officinarum*), henbane (*Hyoscyamus niger*), Jimson weed (*Datura stramonium*), climbing nightshade (*Solanum dulcamara*), and widely used tobacco (*Nicotiana tabacum*). The Solanaceae include a number of commonly collected or cultivated species. The most economically important genus of the family is *Solanum*, which contains the potato (*S. tuberosum*, in fact, another common name of the family is the "potato family"), the tomato (*S. lycopersicum*), and the eggplant or aubergine (*S. melongena*). Another important genus, *Capsicum*, produces both chili peppers and bell peppers.

The genus *Physalis* produces the so-called groundcherries, as well as the tomatillo (*Physalis philadelphica*), the Cape gooseberry and the Chinese lantern. The genus *Lycium* contains the boxthorns and the wolfberry *Lycium barbarum. Nicotiana* contains, among other species, tobacco. Some other important members of Solanaceae include a number of ornamental plants such as *Petunia, Browallia*, and *Lycianthes*, and sources of psychoactive alkaloids, *Datura, Mandragora* (mandrake), and *Atropa belladonna* (deadly nightshade). Certain species are widely known for their medicinal uses, their psychotropic effects, or for being poisonous.

Most of the economically important genera are contained in the subfamily Solanoideae, with the exceptions of tobacco (*Nicotiana tabacum*, Nicotianoideae) and *petunia* (*Petunia*× *hybrida*, Petunioideae).

Many of the Solanaceae, such as tobacco and *petunia*, are used as model organisms in the investigation of fundamental biological questions at the cellular, molecular, and genetic levels.

Members of the Solanaceae family are challenged by a large number of microbes and bacterial and fungal plant pathogens causing diseases. Bacterial spot, caused by *Xanthomonas* spp., is one of the most damaging and difficult to control diseases in vegetable crops. For example, bacterial spot disease has high negative impact on yield of tomato and pepper plants grown in warm, humid regions. Infections typically result in leave and fruit lesions, defoliation, and yield loss of marketable fruit. If weather conditions are optimal for disease development, bacterial spot can cause yield losses up to 50%. *X. perforans* is the dominant species causing bacterial spot disease [13].

3. SUMMARY OF THE INVENTION

The present disclosure, as embodied and broadly described herein, provides:

1. A method of creating a composite colloidal particle formulation comprising an engineered biodegradable particle core, the method comprising:
   a. Contacting an ethanol-based solvent containing dissolved biopolymer with an anti-solvent in a T-piece so as to form a engineered biodegradable particle core; and
   b. Dispersing the engineered biodegradable particle core in a bioadhesive polyelectrolyte solution.

2. The composite colloidal particle formulation produced by the method of claim 1.

3. The composite colloidal particle formulation of claim 2, wherein the engineered biodegradable particle core comprises a plant-derived biopolymer.

4. The composite colloidal particle formulation of claim 2, wherein the engineered biodegradable particle core comprises a lignin, a modified lignin, polysaccharide, modified polysaccharide or a combination thereof.

5. The composite colloidal particle formulation of claim 4, wherein the modified lignin is an unsulfonated or sulfonated lignin.

6. The composite colloidal particle formulation of claim 4, wherein the polysaccharide is cellulose, hemicellulose, lignocellulose, glyco-protein, or a combination thereof.

7. The composite colloidal particle formulation of claim 4, wherein the composite colloidal particle formulation comprises lignin at a concentration of at least 0.001 percent by weight.

8. The composite colloidal particle formulation of claim 2, wherein the composite colloidal particle formulation is cationic.

9. The composite colloidal particle formulation of claim 2, wherein the composite colloidal particle formulation comprises carbohydrates, polypeptides, lectins, proteins, or antibodies or other molecules or materials with affinity to microbes, viruses, seeds, or plant foliage.

10. The composite colloidal particle formulation of claim 2, wherein the composite colloidal particle formulation comprises chitosan at a concentration of at least 0.005 percent by weight.

11. The composite colloidal particle formulation of claim 2, wherein the particle has a diameter of about 10 nm to about 500 nm.

12. A coated article comprising a surface wherein at least a portion of the surface is coated with the composite colloidal particle formulation of claim 2.

13. A method for treating or preventing disease in a plant comprising applying to the plant the composite colloidal particle formulation of claim 2.

14. The method of treating or preventing disease in claim 13 wherein the disease is caused by a bacterial or fungal pathogen.

15. The method of claim 13 wherein the disease is bacterial spot.

16. A method of producing final formulation volumes of at least one liter, of a composite colloidal particle formulation comprising an engineered biodegradable particle core, the method comprising:
   a. Contacting an ethanol-based solvent containing dissolved biopolymer with an anti-solvent in a T-piece so as to form an engineered biopolymer particle core; and
   b. Dispersing the engineered biodegradable particle core in a bioadhesive polyelectrolyte solution.

17. The method of claim 13, wherein the plant is a member of the family Solanaceae.

18. The method of claim 13, wherein the plant is a member of the genus *Capsicum*.

19. The method of claim 13, wherein the plant is a member of the genus *Lycopersicon*.

4. DETAILED DESCRIPTION OF THE INVENTION

Figure 1:
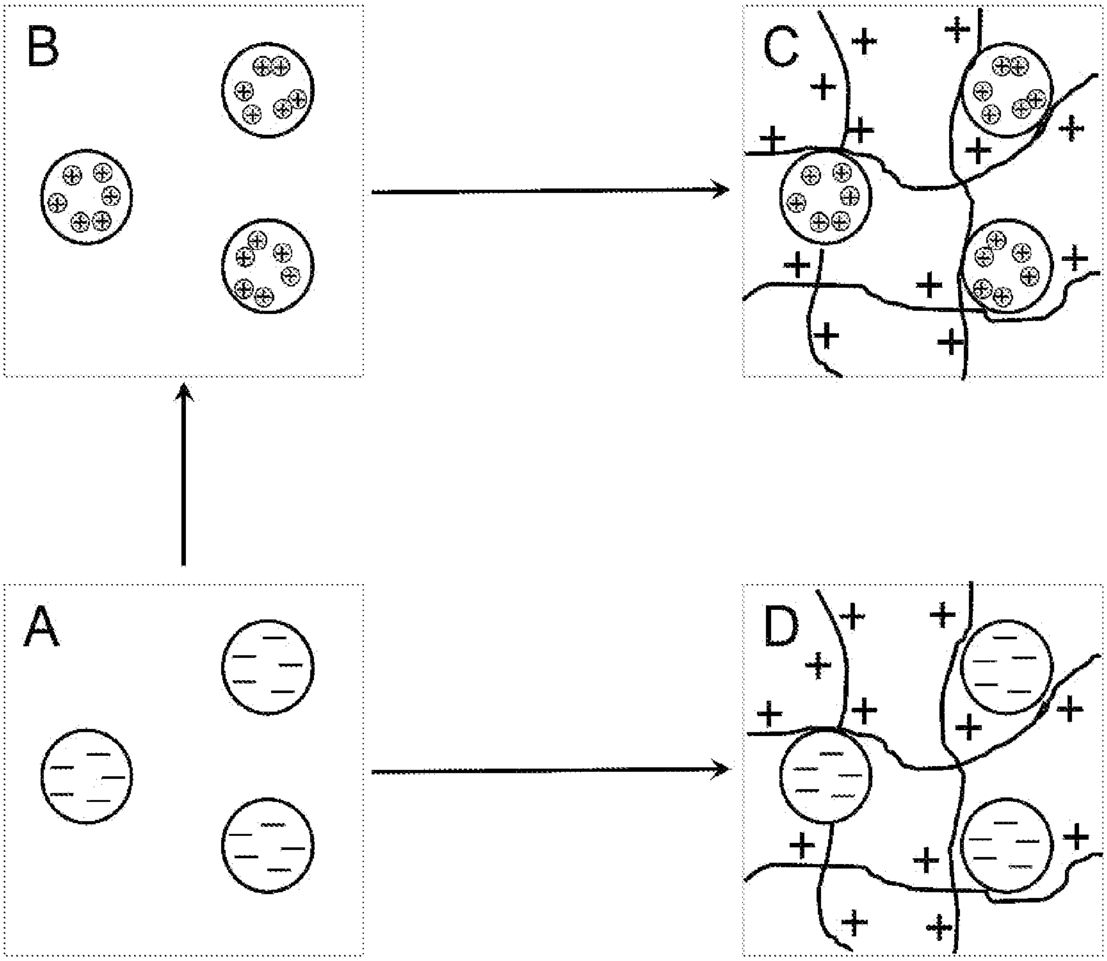
FIG. 1. Schematic of negatively charged engineered biopolymer particles (A), comprising metal ions (B) and/or dispersed in cationic polyelectrolyte to obtain positively charged functional composite colloidal particle formulations (C and D).
Figure 2:
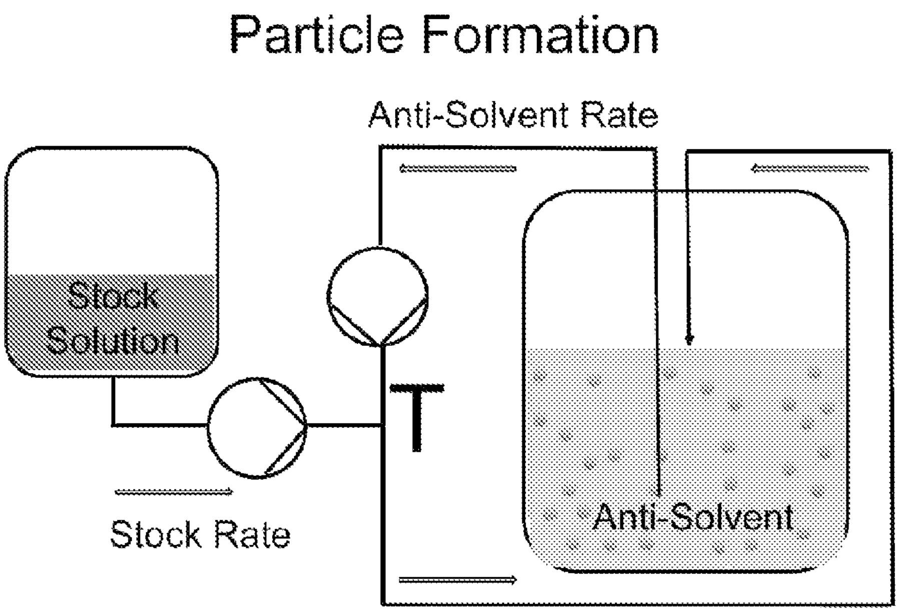
FIG. 2. Schematic of the fabrication process for preparation of engineered biopolymer particles. The biopolymer is dissolved in ethanol-water (referred as biopolymer stock solution) which is mixed with anti-solvent in a T-unit piece (denoted by T). This results in formation of biopolymer engineered biodegradable particles dispersed in anti-solvent.
Figure 3A:
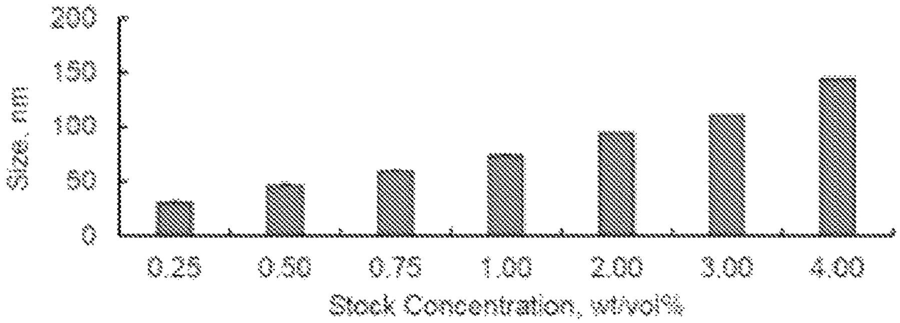
FIG. 3. (A) Dependence of hydrodynamic diameter, (B) particle size distribution measured by polydispersity index—PDI, (C) particle size range, and (D) zeta potential on biopolymer stock concentration (n=3).
Figure 3B:
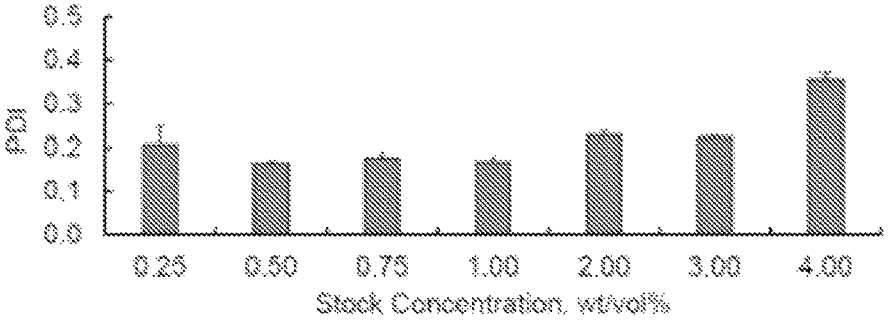
Figure 3C:
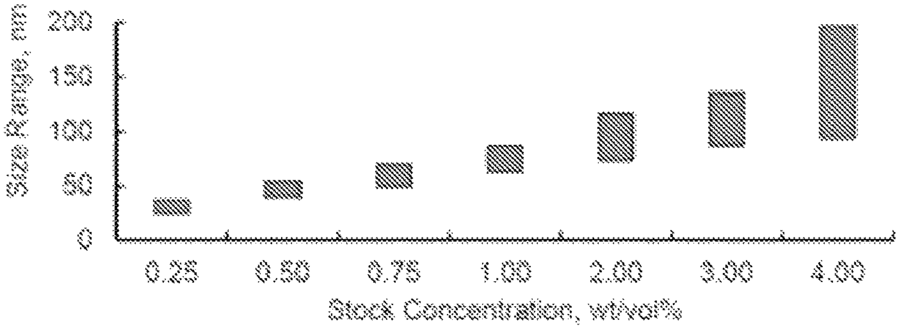
Figure 3D:
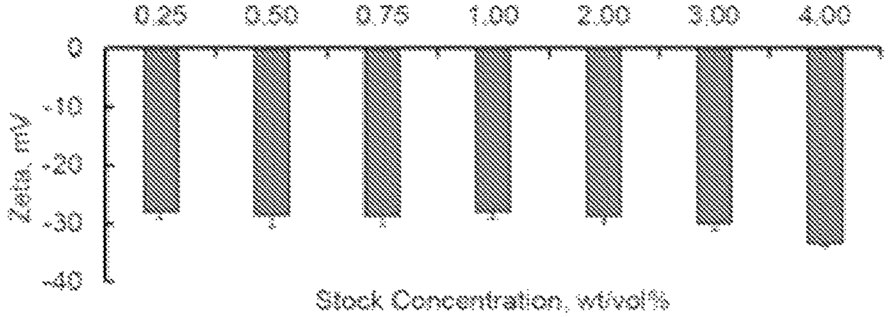
Figure 4A:
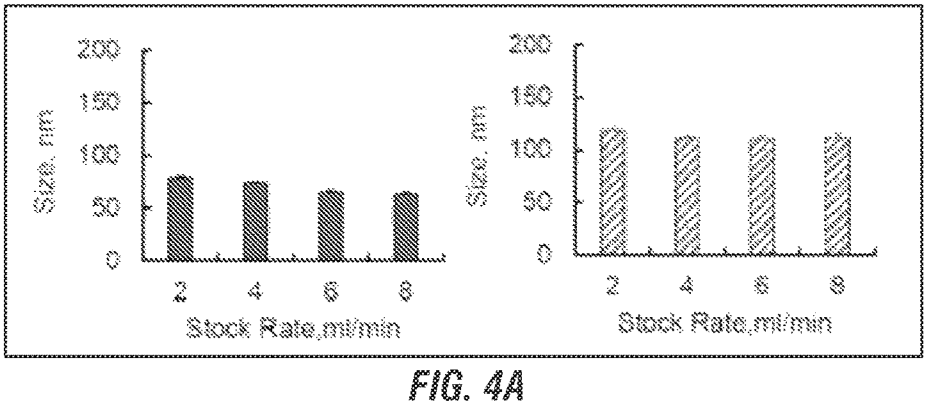
FIG. 4. (A) Dependence of hydrodynamic diameter, (B) particle size distribution measured by polydispersity index—PDI, (C) particle size range, and (D) zeta potential on biopolymer volumetric stock rate (n=3). Solid bars denote 1 wt % biopolymer stock concentration. Patterned bars denote 3 wt % biopolymer stock concentration.
Figure 4B:
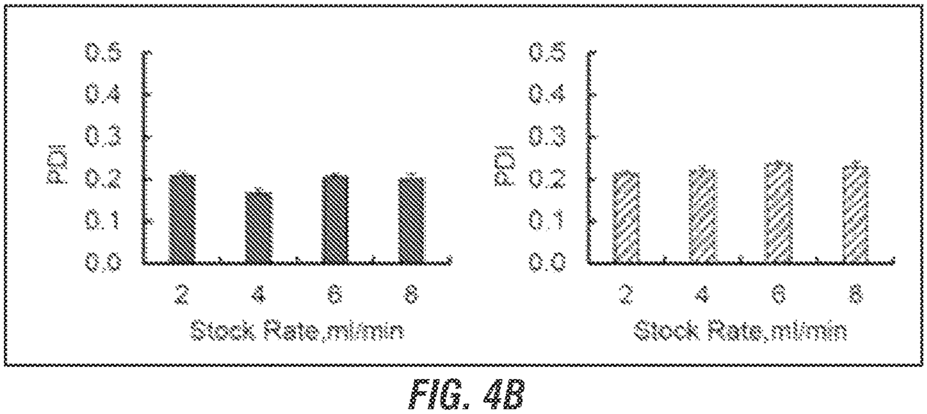
Figure 4C:
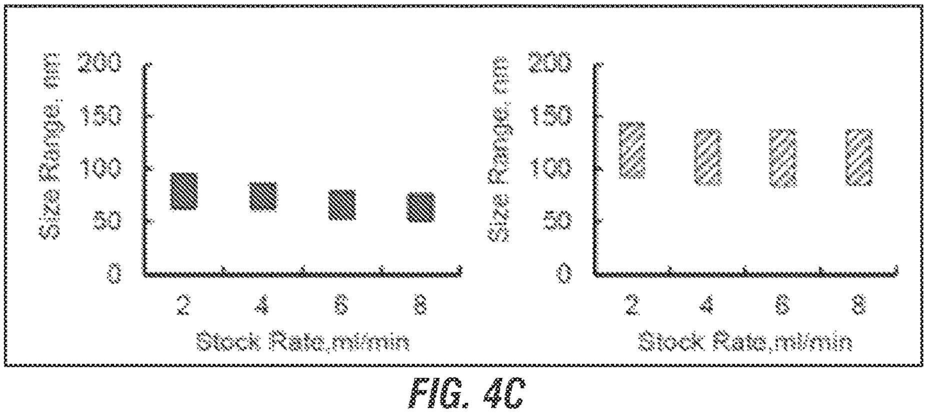
Figure 4D:
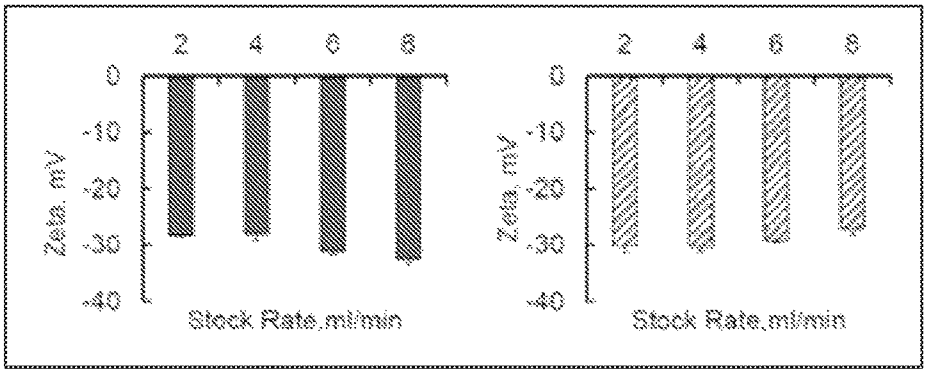
Figure 5A:
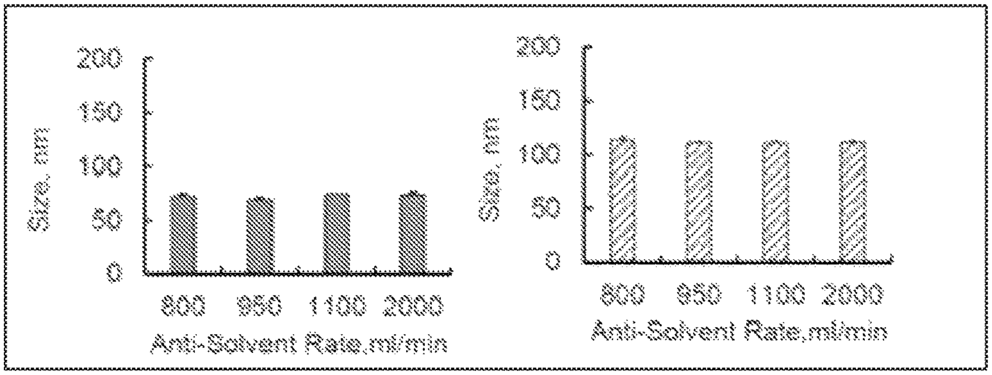
FIG. 5. (A) Dependence of hydrodynamic diameter, (B) particle size distribution measured by polydispersity index—PDI, (C) particle size range, and (D) zeta potential on anti-solvent volumetric flow rate (n=3). Solid bars denote 1 wt % biopolymer stock concentration. Patterned bars denote 3 wt % biopolymer stock concentration.
Figure 5B:
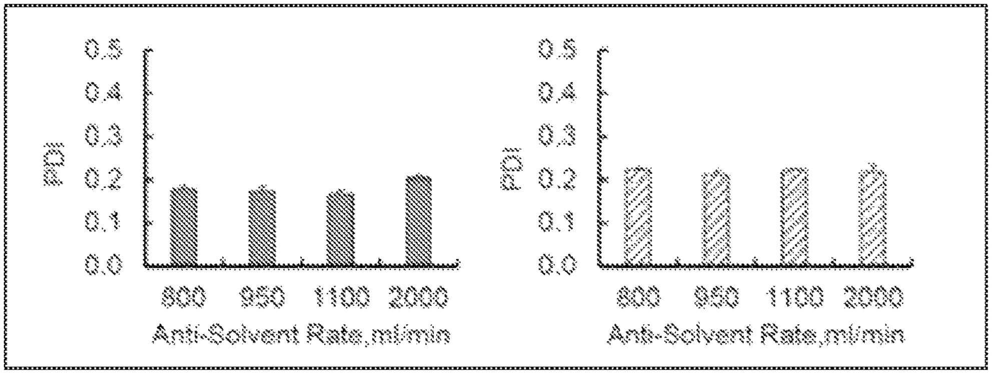
Figure 5C:
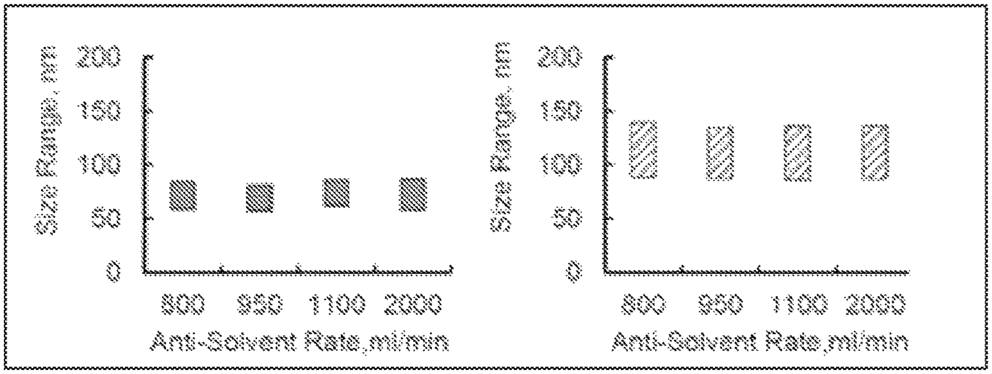
Figure 5D:
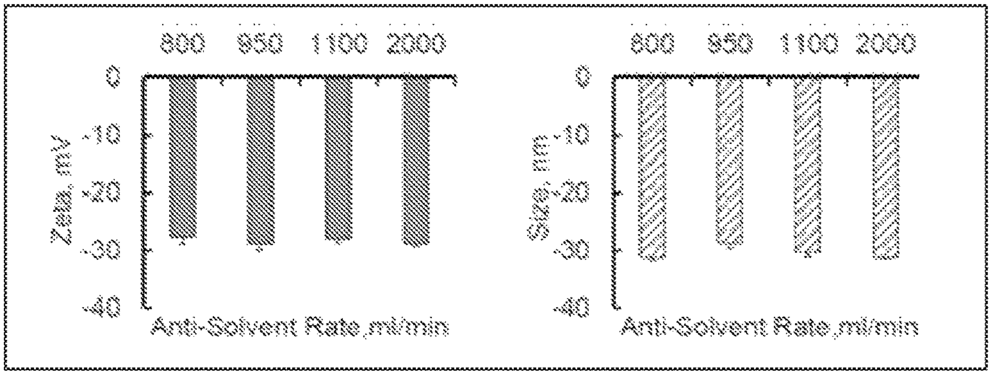
Figure 6A:
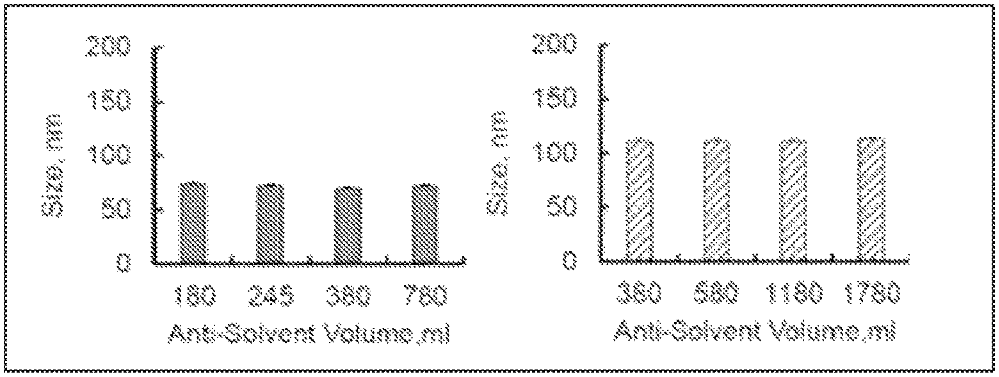
FIG. 6. (A) Dependence of hydrodynamic diameter, (B) particle size distribution measured by polydispersity index—PDI, (C) particle size range, and (D) zeta potential on anti-solvent volume (n=3). Solid bars—1 wt % biopolymer stock concentration. Patterned bars—3 wt % biopolymer stock concentration.
Figure 6B:
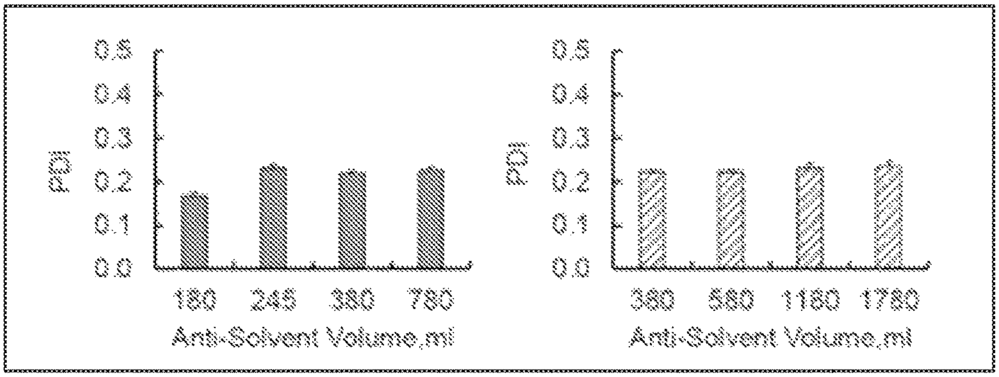
Figure 6C:
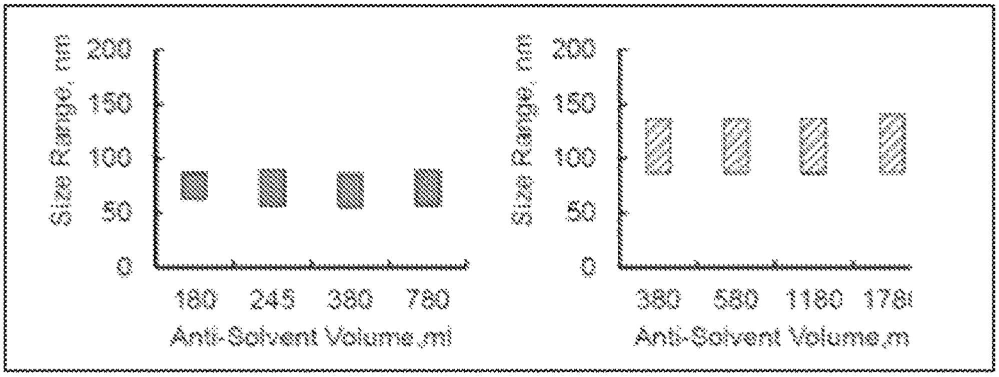
Figure 6D:
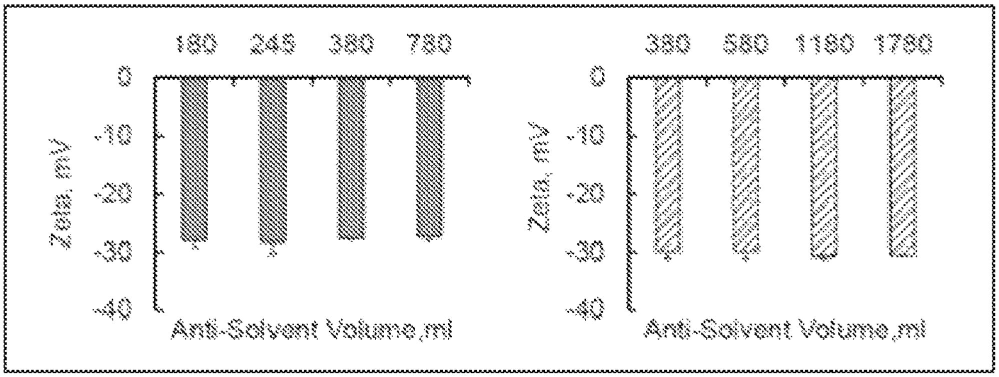

1. Results 1.1 Preparation and Characterization of Engineered Colloidal Particles Made of Biopolymer Despite the exciting potential benefits that colloidal materials can bring in a wide range of industries [1, 6, 9, 12, 15], the number of the available commercial applications and products is limited. The problem is the need to generate stable colloidal formulations on a large scale at low manufacturing costs. Here disclosed is a new bench scale semi-continuous system that can produce large volumes of concentrated colloidal particle solutions in a controlled manner. FIG. 2 depicts the unit operations of the process which is highly efficient, green (being mostly water-based), inexpensive and scalable.

The first step in the fabrication of engineered colloidal particles involves dissolving the biopolymer, organosolv lignin, in a common solvent to form a solution (also referred to as stock solution). The choice of solvent in this step is an important aspect of process sustainability. From a range of available solvents for lignin, ethanol was chosen as the solvent. Ethanol is generally recognized as non-toxic, biodegradable, and biorenewable solvent. It is classified as an environmentally preferable green solvent because it is commonly produced by fermenting renewable sources, including sugars, starches, and lignocelluloses. In comparison with other solvents, ethanol is a relatively low-cost and readily available.

The second step in the formation of engineered colloidal particles involves mixing of lignin solvent stock and anti-solvent medium—water—in a T-unit piece. The T-unit piece is a junction in which two flow streams—the lignin stock stream and the anti-solvent stream) enter a mixing chamber perpendicularly through thin tubing to form engineered colloidal particle cores. A third stream, the engineered colloidal particle cores exit the T-unit piece. Water acts as non-solvent reducing the solubility of the lignin molecules and aggregating them to form particles. In the mixing step, the lignin solution and the anti-solvent liquid streams are pumped at different rates into the T-unit piece with digitally controlled liquid pumps. The synthesis of the particles is anticipated to occur at the point of mixing, where the anti-solvent meets lignin-solvent solution in the T-unit piece. This semi-continuous flow system is able to formulate larger volumes of lignin particle suspensions and achieves decoupling of particle concentration and particle size.

The role of the key process variables including initial concentration of molecular organosolv lignin in the stock solution, the volumetric lignin stock flow rate, the volumetric anti-solvent flow rate, and anti-solvent volume was investigated. One process variable was systematically varied at a time, while the rest were kept constant. Particle size, polydispersity, and zeta-potential were measured by dynamic light scattering techniques. The results from these studies are presented in FIGS. 3, 4, 5, and 6. The data in FIG. 3 show that lignin particle size increases with increasing stock concentration. Two lignin stock concentrations, 1 wt % and 3 wt %, were studied in more detail and the results are presented in FIGS. 4, 5 and 6.

Figure 7A:
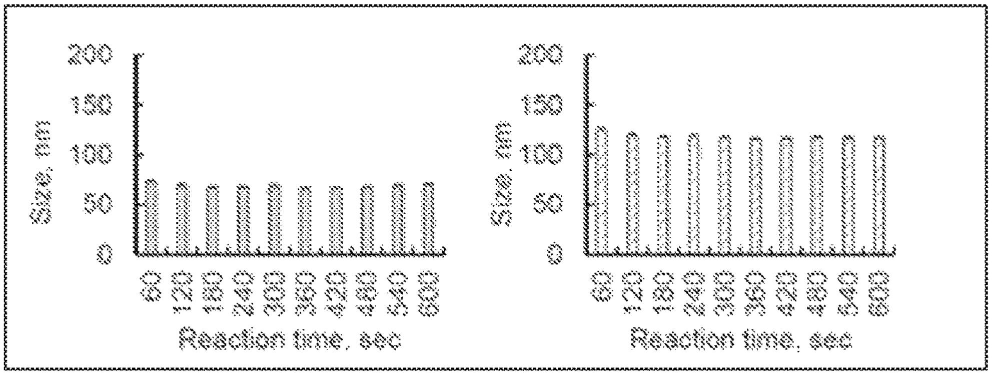
FIG. 7. Mechanism of particle formation. (A) Evolution of hydrodynamic diameter, (B) particle size distribution measured by polydispersity index—PDI, (C) particle size range, and (D) zeta potential over reaction time (n=3). Solid bars—1 wt % biopolymer stock concentration. Patterned bars—3 wt % biopolymer stock concentration.
Figure 7B:
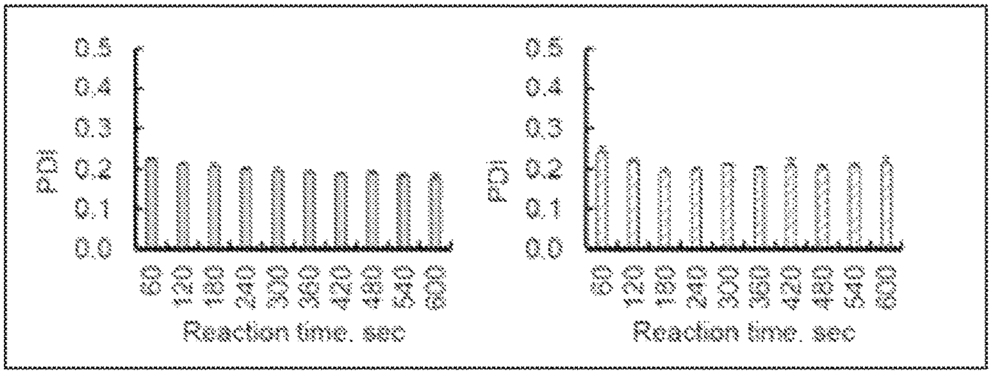
Figure 7C:
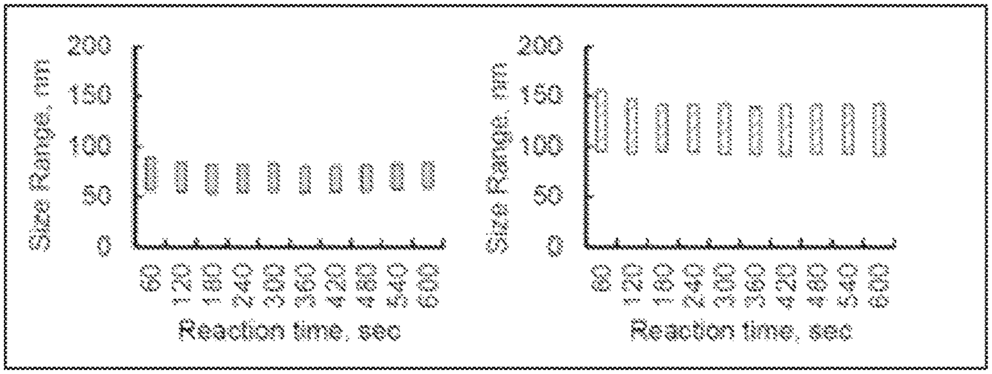
Figure 7D:
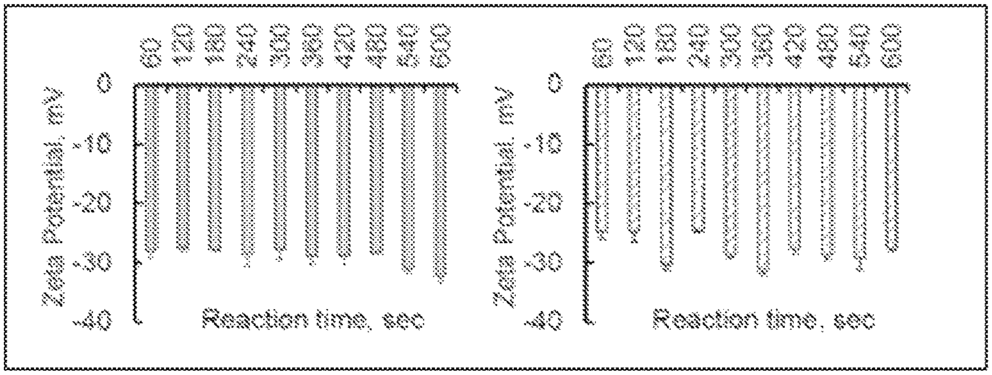

1.2 Mechanism of Formation of Engineered Colloidal Particles Made of Organosolv Lignin Biopolymer In addition to characterizing the relationship between the process control variables and resulting particle size and other characteristics, the mechanism of particle formation was elucidated. This mechanism can be deduced from the data in FIG. 7. The lignin particle size was characterized in a sample taken from the reaction mixture every 60 seconds. The most important and somewhat unexpected feature of the data in FIG. 7A is that the particle size does not change as the reaction progresses. This means that particles forming upon mixing of lignin stock with anti-solvent in the T-unit piece do not experience particle growth or Ostwald ripening. This determines the uniformity of the particle sizes and low particle polydispersity in the system. Further, due to this particular mechanism of particle formation, a decoupling of particle size from particle concentration is possible. Addition of lignin stock to particle suspension results into the formation of more particles of the same size.

Figure 8A:
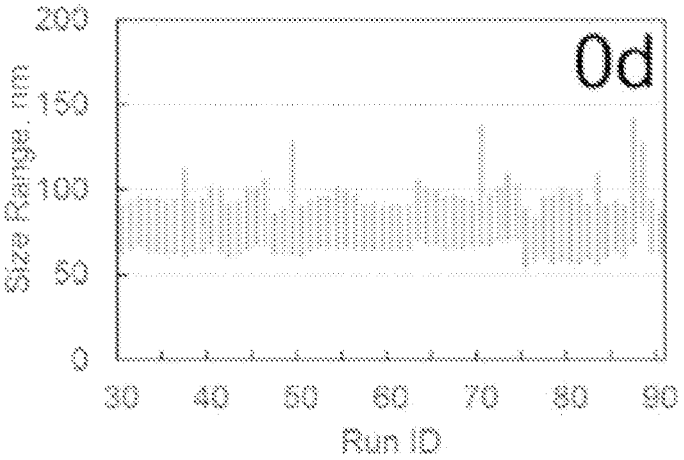
FIG. 8. Stability of engineered biopolymer particles as indicated by the change of particle size range over time. (A) At formulation—0 d; (B) One (1) week post formulation—1 w; (C) Six (6) months post formulation—6 m.
Figure 8B:
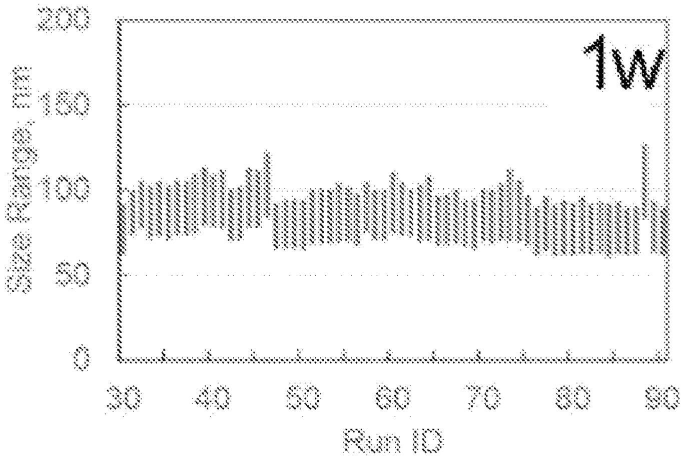
Figure 8C:
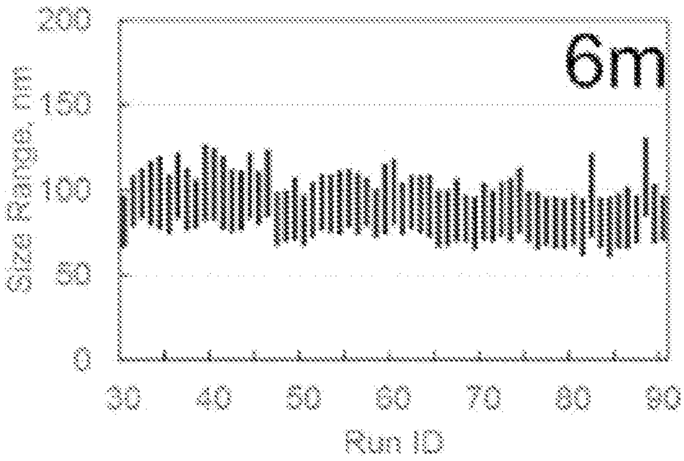

1.3 Stability of Engineered Colloidal Particles Made of Organosolv Lignin Biopolymer Over Time The long-term stability of the particle solutions was evaluated after samples were kept at room temperature and particle parameters were measured after 1 week and after 6 months. These data including sample stability and product shelf life are shown in FIG. 8. All formulations were proven to be very stable in storage for at least 6 months, which is very promising for product development.

Figure 9A:
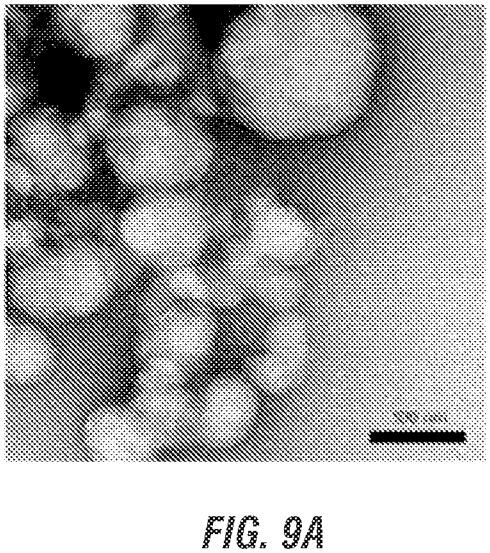
FIG. 9. Morphology of biopolymer engineered biodegradable particle cores one day after preparation (A) and 6 months post-preparation (B) as determined by transmission electron microscopy.
Figure 9B:
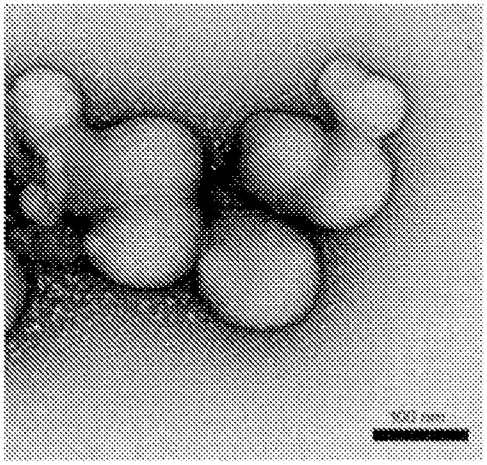

The morphology of the lignin particles was visualized with transmission electron microscopy shortly after preparation and 6 months later—FIG. 9. The particles are approximately spherical in shape and are mostly uniform in size which confirms the results from the dynamic light scattering measurements.

1.4 Functionalization of Engineered Colloidal Particles with Metal Ions

Figure 10A:
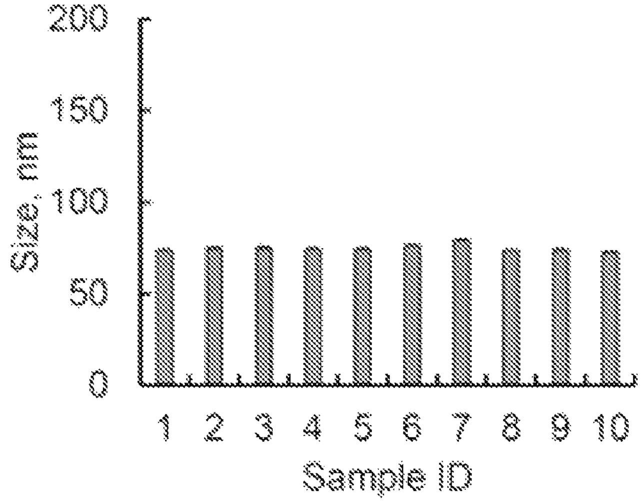
FIG. 10. (A) Hydrodynamic diameter, (B) polydispersity index, PDI, and (C) zeta potential for ten randomly selected samples of engineered biodegradable particle cores containing copper ions (0.01 wt %).
Figure 10B:
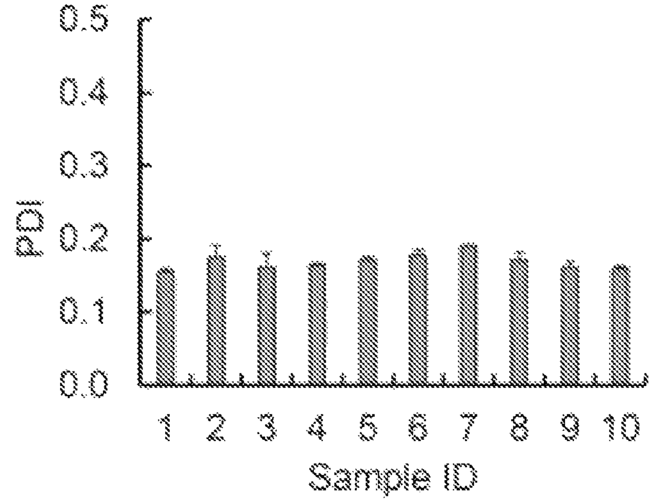
Figure 10C:
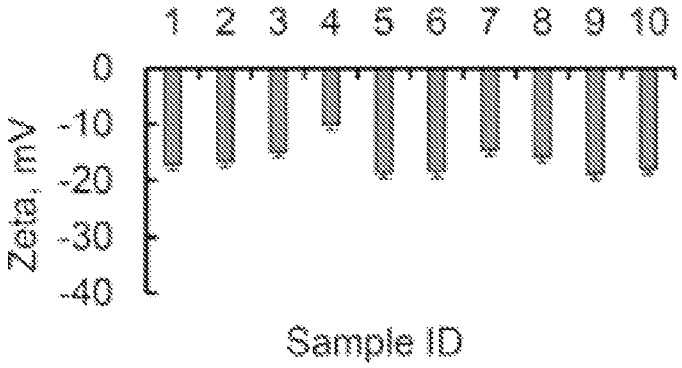

Having achieved scalable fabrication of colloidal lignin particles with controlled sizes, the next step is to load the particles with active ingredients. Copper ($Cu^{2+}$) ions were used as model actives that were attached to the lignin particles. Ionic copper has wide spectrum of anti-fungal and anti-bacterial activity and remains the most important fungicide in organic agriculture [13]. Simple mixing procedures to infuse lignin particles with copper ions was utilized. Because colloidal lignin particles have high surface area, the contact of the active ingredient with the pathogen will be enhanced. The large area of surface contact is expected to increase functional potency of copper ions. This results in better efficiency per unit active ingredient therefore reducing the amount of the active ingredient. The measured size and zeta-potential of colloidal lignin particles functionalized with copper ions are presented in FIG. 10.

Figure 11A:
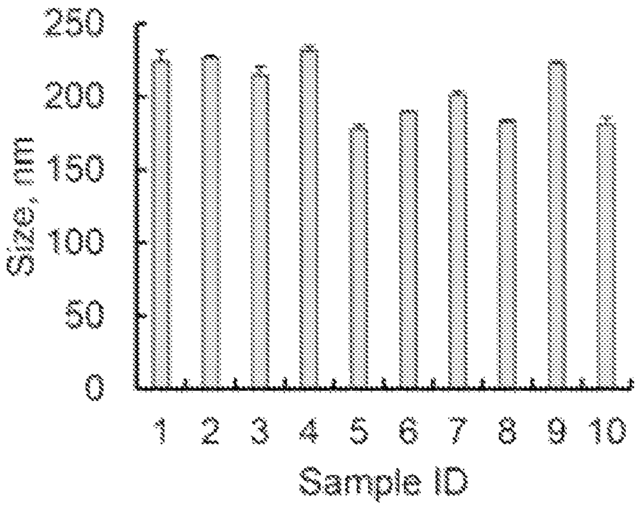
FIG. 11. (A) Hydrodynamic diameter, (B) polydispersity index, PDI, and (C) zeta potential for ten randomly selected samples of engineered biodegradable particle cores containing copper ions at 0.01 wt % in bioadhesive solution of chitosan at 0.01 wt %.
Figure 11B:
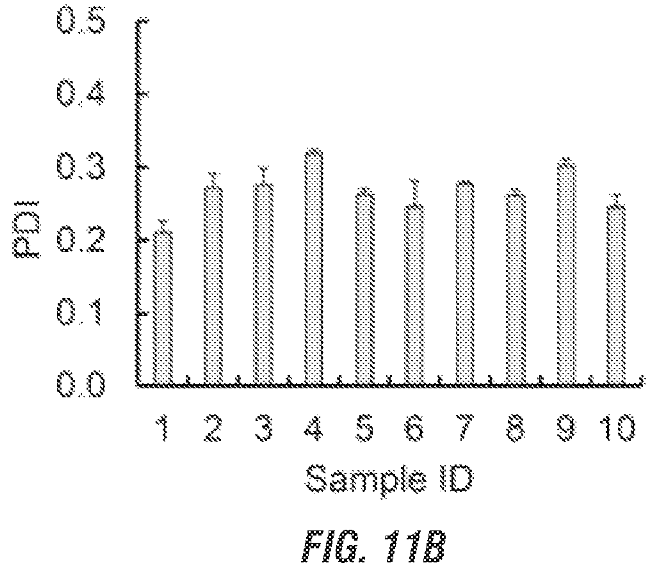
Figure 11C:
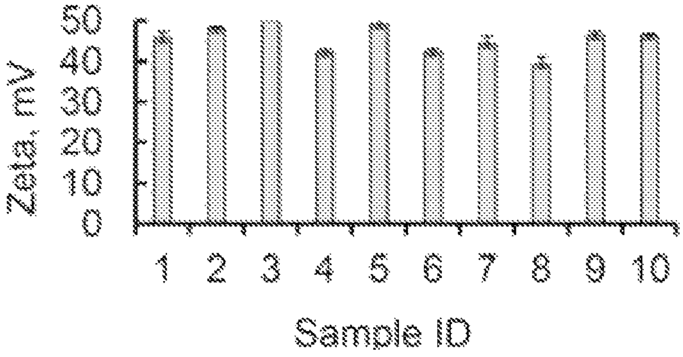
Figure 12A:
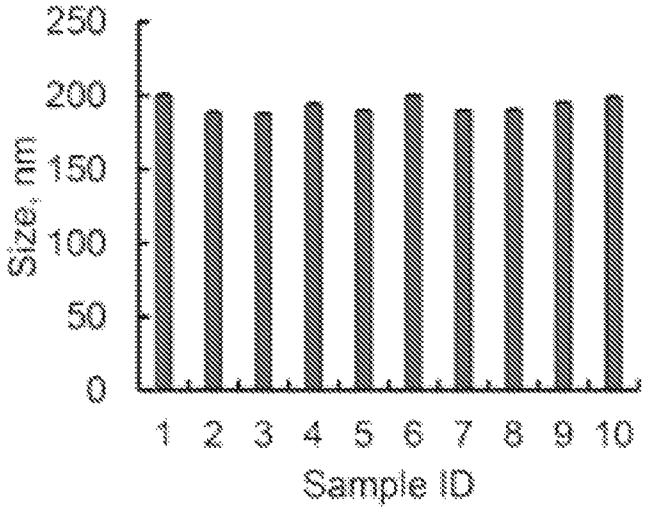
FIG. 12. (A) Hydrodynamic diameter, (B) polydispersity index, PDI, and (C) zeta potential for ten randomly selected samples of engineered biodegradable particle cores formulation in bioadhesive solution of chitosan at 0.01 wt %.
Figure 12B:
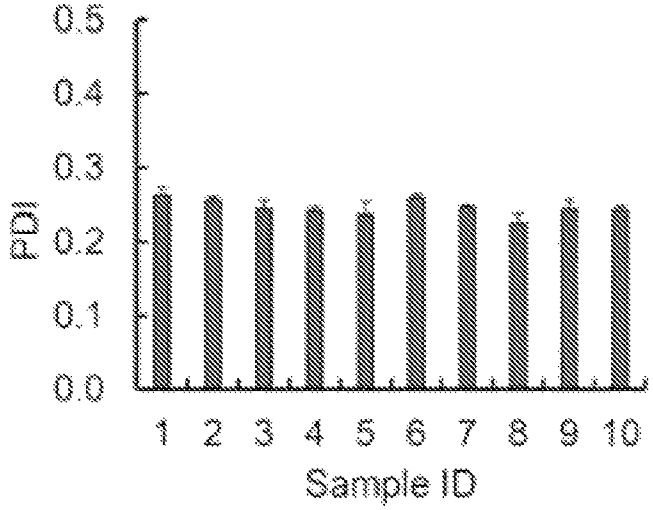

1.5a Preparation and Characterization of Composite Colloid Particle Formulation Comprising Engineered Lignin Particles, Metal Ions and Bioadhesive Cationic Polyelectrolyte To further optimize the delivery of the active ingredients, the metal ion modified lignin particles can be dispersed in a bio-adhesive polyelectrolyte solution. The cationic polyelectrolyte low molecular chitosan was utilized for this purpose. Chitosan is a natural linear polysaccharide produced by deacetylation of chitin from crab and shrimp shells. The presence of chitosan in the colloidal formulation has a dual function. First, these biopolymer molecules sterically stabilize the colloidal formulation and prevent it from aggregation. Second, the positively charged chitosan molecules have the capacity to promote their attachment and adhesion to surfaces such as plant foliage resulting in better surface coverage, which in turn is expected to contribute to more efficient and longer lasting field application. The measured size and zeta-potential of the colloidal lignin particle formulations are presented in FIGS. 11 and 12. Note that in the presence of chitosan lignin—copper colloidal particles undergo a charge reversal, i.e., transition from negatively charged particles to positively charged colloidal particles, —FIG. 11C.

Figure 12C:
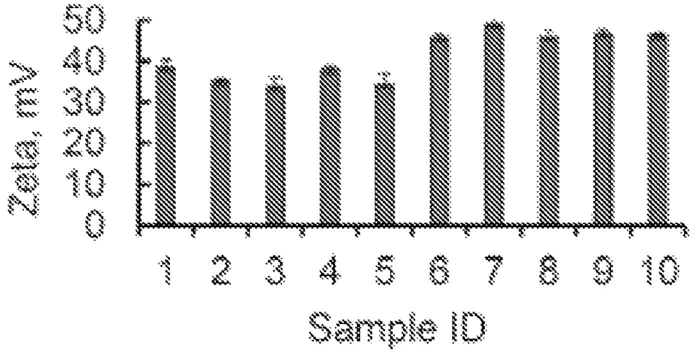

1.5b Preparation and Characterization of Composite Colloid Particle Formulation Comprising Engineered Lignin Particles, and Bioadhesive Cationic Polyelectrolyte Preparation of composite colloidal particle formulations comprising engineered lignin particles in chitosan solution was accomplished as described in section 1.5a but without the presence of metal ions. Solutions of colloidal lignin particles were simply added to solution of low molecular weight chitosan in water. FIG. 12C documents a charge reversal from negative to positive upon addition of addition of engineered colloidal particles to the chitosan solution. The disease preventing- and treating-properties of these formulations are described in the sections below.

1.6 In Vitro Antimicrobial Testing

*X. perforans* is the dominant species causing bacterial spot disease [13]. Two *X. perforans* strains: 242 (18-013) which is a copper resistant strain and the copper sensitive strain 282 (18-003) were studied. For short-term storage and experiments, the bacteria were grown on nutrient agar (NA) at 28° C. Bacterial colonies were transferred to NA plates containing copper sulphate pentahydrate ($CuSO_4 \cdot 5H_2O$) at 0.08 μmol/l and incubated for 24 h at 28° C. The antibacterial testing was conducted as described in Ref. [13].

1.6.1 Quantitative Antimicrobial Test on Copper-Sensitive *Xanthomonas perforans*

Figure 13:
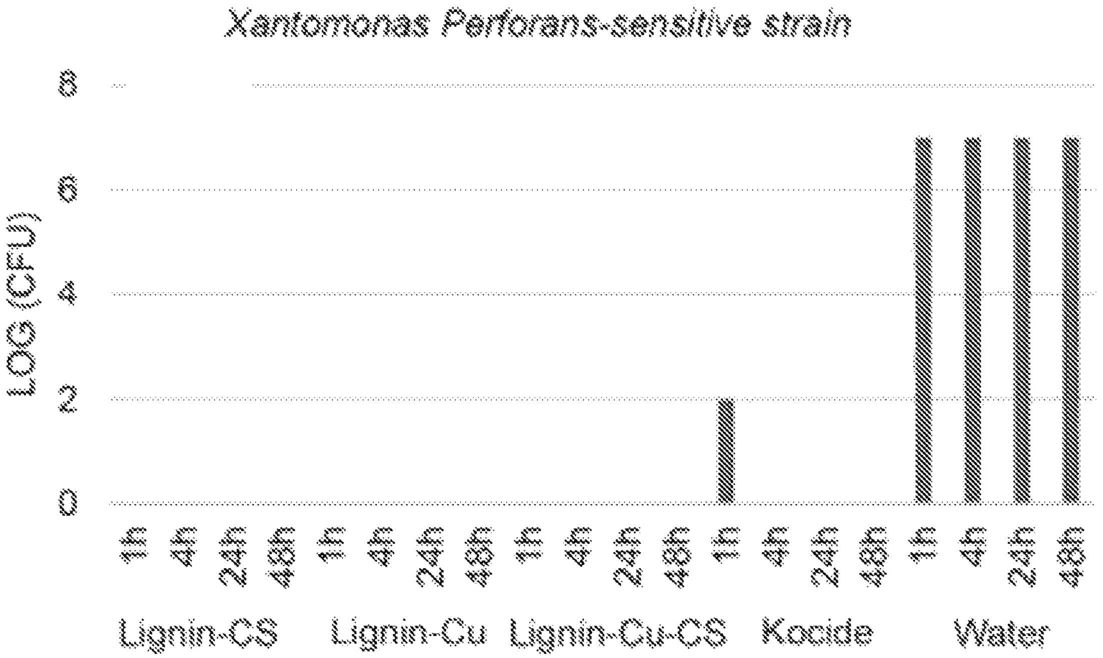
FIG. 13. In vitro activity of engineered composite lignin (0.01 wt %)—chitosan (0.01 wt %), lignin (0.01 wt %)—copper (0.01 wt %), and lignin (0.01 wt %)—copper (0.01 wt %)—chitosan (0.01 wt %), particle formulations. Kocide 3000 (Cu ions 0.1 wt %) and sterile deionized water were used as the positive and negative control, respectively (n=4). Experiments with copper sensitive *X. perforans* strain. CFU=colony forming units.

In vitro, all lignin-based formulations demonstrated antibacterial efficacy against the copper sensitive strain-FIG. 13. All composite colloidal particle formulations at concentration 0.01 wt % completely inhibited bacterial growth after 1 h of incubation. As expected, Kocide 3000 adversely affected the growth of the copper sensitive strain 282 (18-003). Bacterial populations treated with Kocide 3000 were significantly reduced (P=0.05) after 1 h of incubation. Exposure beyond 1 h helped eliminate recurrent bacterial growth.

1.6.2 Quantitative Antimicrobial Tests on Copper-Tolerant *Xanthomonas perforans*

Figure 14:
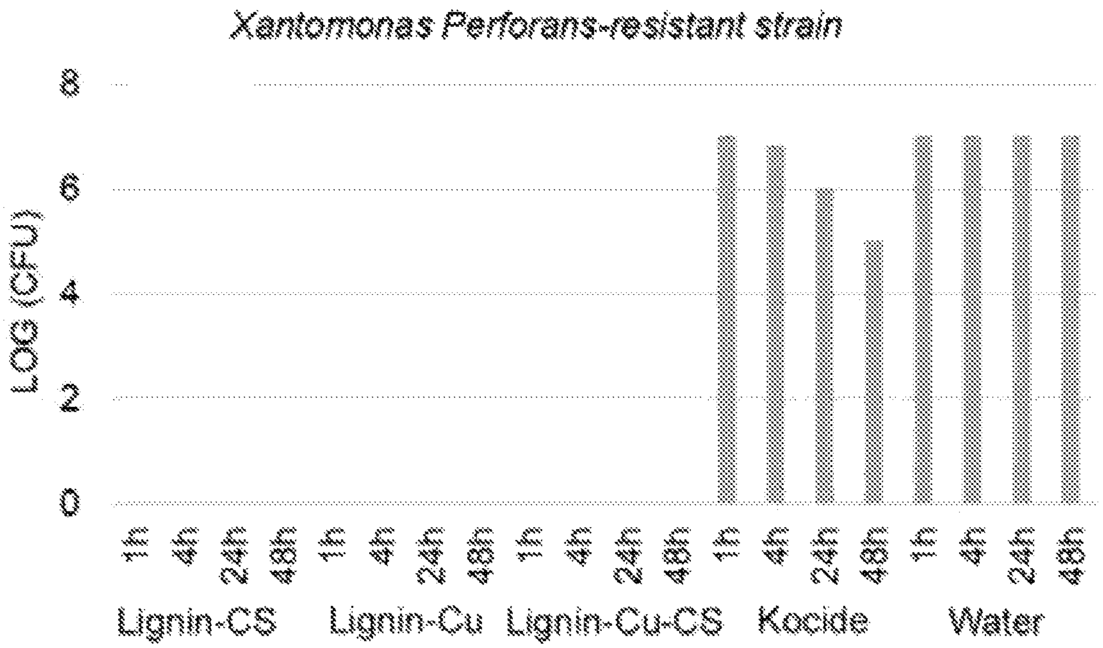
FIG. 14. In vitro activity of engineered composite lignin (0.01 wt %)—chitosan (0.01 wt %), lignin (0.01 wt %)—copper (0.01 wt %), and lignin (0.01 wt %)—copper (0.01 wt %)—chitosan (0.01 wt %) particle formulations. Kocide 3000 (Cu ions at 0.1 wt %) and sterile deionized water were used as the positive and negative control, respectively (n=4). Experiments with copper resistant *X. perforans* strain. CFU=colony forming units.

In vitro, all lignin-based formulations demonstrated antibacterial efficacy against the copper resistant strain—FIG. 14. All composite colloidal particle formulations at concentration 0.01 wt % completely inhibited bacterial growth after 1 h of incubation. In contrast, copper-based Kocide 3000 bactericide at 0.1 wt % did not reduce bacterial population significantly (P=0.05) when compared to untreated control. Unlike Kocide 3000, all lignin-based formulations, lignin (0.01 wt %)—chitosan (0.01 wt %), lignin (0.01 wt %)—copper (0.01 wt %), and lignin (0.01 wt %)—copper (0.01 wt %)—chitosan (0.01 wt %) had the same effect on the copper sensitive and the copper resistant strains.

1.7. Field Testing of Composite Colloidal Particle Formulations

To evaluate the efficacy of the composite colloidal particle formulations against bacterial spot disease in the open field in tomato crops, one field trial was conducted with bacterial inoculation and one field trial was conducted without inoculation. Except for the inoculation step, in both trials agronomic and data analysis protocols were very similar. To evaluate the efficacy of the composite colloidal particle formulations against bacterial spot disease in the open field in pepper crops one field trial was conducted. This trial followed the protocols of the inoculated tomato trial.

Formulations tested in the field included lignin particles (0.01 wt %) with chitosan at (0.01 wt %) (Treatment D), lignin particles (0.01 wt %) with copper ions (0.01 wt %) and with chitosan (0.01 wt %) (Treatment E), and lignin particles (0.01 wt %) with copper ions (0.01 wt %) (Treatment F). Controls included water (Treatment A), Kocide 3000 at 0.064 wt % copper ions (Treatment B), and growers standard (Kocide 3000 at 0.064 wt %+Actigard at 0.5 oz+Manzate Pro-Stick at 0.18 wt %) (Treatment C). Treatments were applied weekly for 8 weeks using a CO2 pressurized backpack sprayer equipped with a hand-held boom and one, two, or three hollow cone nozzles (TXVS-26) at 45 psi. Spray rate (gal/acre) increased as plants grew: 45 gal/acre for three weeks, 55 gal/acre for three weeks, then 65 gal/acre for the final two weeks. In the first field trial plants 1, 8 and 15 in each row were spray-inoculated with copper-resistant strain of *X. perforans* bacterial suspension (5.10×8 CFU/ml). The severity of bacterial spot was evaluated weekly using a modified Horsfall-Barratt scale [13]. The area under the disease progress curve (AUDPC) was calculated using the method described in [13]. All statistical analysis were completed using IBM SPSS Statistics. AUDPC were examined using analysis of variance (ANOVA) followed by pairwise comparison using the Least Significant Difference (LSD) method with a P value of 0.05.

Figure 15:
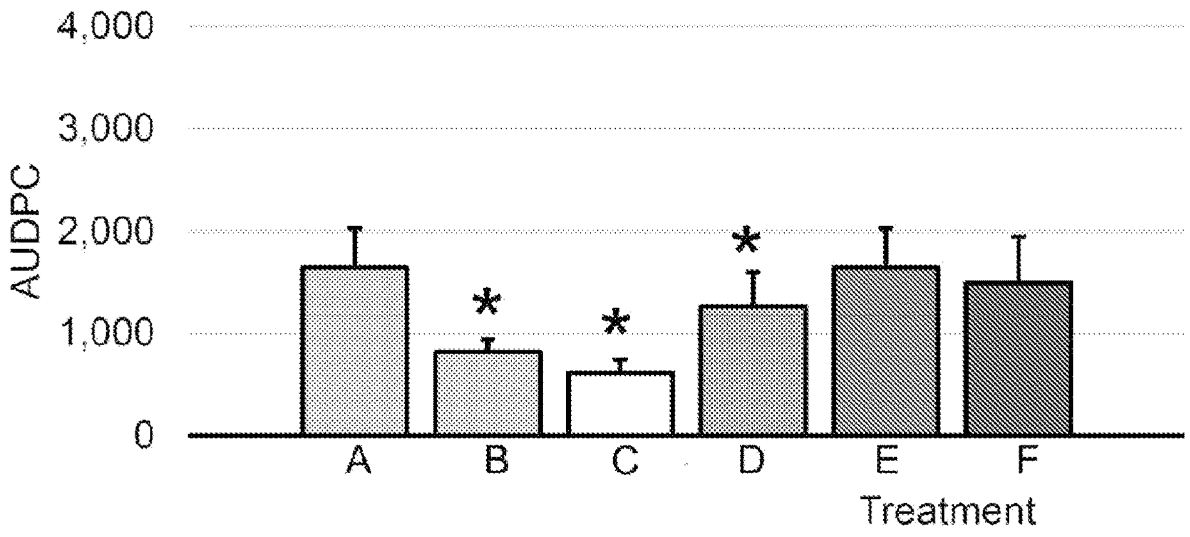
FIG. 15. Field test with inoculation-tomato: (A) Effect of composite colloidal particle formulations (lignin (0.01 wt %)—chitosan (0.01 wt %)—Treatment D; lignin (0.01 wt %)—copper (0.01 wt %)—chitosan (0.01 wt %)—Treatment E; lignin (0.01 wt %)—copper (0.01 wt %)—Treatment F; on bacterial spot disease severity in the open field. Water—Treatment A; Kocide 3000—Treatment B; and the growers' standard—Treatment C were used as control treatments. AUDPC=area under disease progress curve. Error bars=standard deviation (n=4). * denotes statistical significance at P<0.05.
Figure 16:
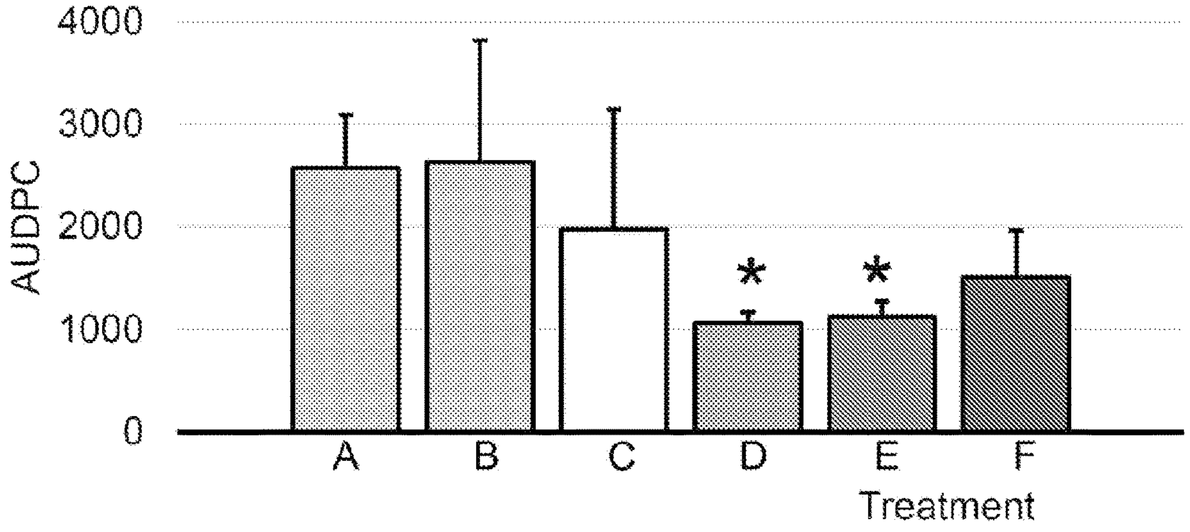
FIG. 16. Field test without inoculation—tomato: (A) Effect of composite colloidal particle formulations (lignin (0.01 wt %)—chitosan (0.01 wt %)—Treatment D; lignin (0.01 wt %)—copper (0.01 wt %)—chitosan (0.01 wt %)—Treatment E; lignin (0.01 wt %)—copper (0.01 wt %)—Treatment F; on bacterial spot disease severity in the open field. Water—Treatment A; Kocide 3000—Treatment B; and the growers' standard—Treatment C were used as control treatments. AUDPC=area under disease progress curve. Error bars=standard deviation (n=6). * denotes statistical significance at P<0.05.
Figure 17:
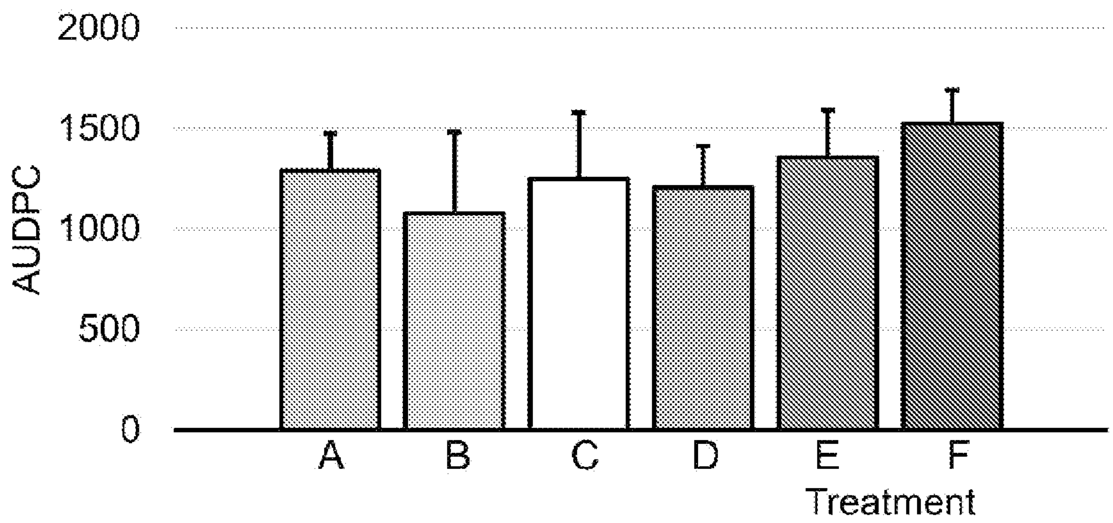
FIG. 17. Field test—pepper: (A) Effect of composite colloidal particle formulations (lignin (0.01 wt %)—chitosan (0.01 wt %)—Treatment D; lignin (0.01 wt %)—copper (0.01 wt %)—chitosan (0.01 wt %)—Treatment E; lignin—copper (0.01 wt %)—Treatment F; on bacterial spot disease severity in the open field. Water—Treatment A; Kocide 3000—Treatment B; and the growers' standard—Treatment C were used as control treatments. AUDPC=area under disease progress curve. Error bars=standard deviation (n=6).

The results from the field research are presented in FIG. 15, FIG. 16 and FIG. 17, respectively. The growers standard, Kocide 3000 and lignin particles with bio-adhesive chitosan (0.01 wt %) provided the best control of bacterial spot in the first trial. In the second trial lignin particles coated with chitosan (Treatment D), lignin particles with copper ions and with chitosan (Treatment E) provide best control of bacterial spot as measured by the area under the disease progress curve.

1.8. Elemental Analysis

Elemental analysis was conducted in tomato fruit that was harvested in the second field trial. Fruit were collected 7 days after last application of test composite colloidal particle formulation (lignin-chitosan formulation) and analyzed for elemental composition using Induction Coupled Plasma Optical Emission Spectroscopy (Thermo-Jarrell Ash, Franklin, MA) (14). As seen in Table 1 there were no significant differences for any of the elements when comparing elemental compositions for the active and control untreated sample.

TABLE 1

Elemental accumulation in tomato fruit collected from fields treated with lignin-chitosan composite colloidal particle formulation, compared to untreated control.

| Element ID | Elemental Accumulation in Fruit, mg/kg fresh weight L-CS treated | Untreated Control | Significance P = 0.5 |
|---|---|---|---|
| Al | 0.37 ± 0.03 | 0.3 ± 0.02 | NS |
| B | 0.62 ± 0.03 | 0.63 ± 0.04 | NS |
| Ca | 67.19 ± 4.98 | 57.73 ± 3.6 | NS |
| Cu | 0.32 ± 0.03 | 0.27 ± 0.02 | NS |
| Fe | 2.17 ± 0.35 | 1.75 ± 0.1 | NS |
| K | 1831.59 ± 59.77 | 1927.24 ± 75.05 | NS |
| Mg | 83.07 ± 1.81 | 80.23 ± 3.85 | NS |
| Mn | 1.3 ± 0.2 | 1.3 ± 0.22 | NS |
| Na | 14.66 ± 1.01 | 17.42 ± 2.69 | NS |
| P | 101.42 ± 5.06 | 126.66 ± 19.63 | NS |
| S | 72.9 ± 3.96 | 77.65 ± 4.25 | NS |
| Si | 0.65 ± 0.04 | 0.66 ± 0.09 | NS |
| Zn | 0.88 ± 0.08 | 0.87 ± 0.07 | NS |

I claim:

1. A composite colloidal particle formulation ready for administration to treat or prevent disease in plants comprising:

a solid colloidal particle dispersed in a volume of a polyelectrolyte solution, wherein the solid colloidal particle is plant-derived and comprises a lignin or modified hydrophobic lignin, and wherein the volume of polyelectrolyte solution is a liquid continuous phase and comprises a chitosan, water, and ethanol, wherein the formulation is fully biodegradable.

2. The composite colloidal particle formulation of claim 1, wherein the solid colloidal particle comprises lignin at a concentration of at least 0.001 percent by weight.

3. The composite colloidal particle formulation of claim 1, wherein the polyelectrolyte solution comprises chitosan at a concentration of at least 0.005 percent by weight.

4. The composite colloidal particle formulation of claim 1, wherein the solid colloidal particle has a diameter of about 10 nm to about 500 nm.

5. A coated article comprising a surface wherein at least a portion of the surface is coated with the composite colloidal particle system of claim 1.

6. A method for treating or preventing disease in a plant comprising applying to the plant the composite colloidal particle formulation of claim 1.

7. The method of treating or preventing disease in claim 6 wherein the disease is caused by a bacterial or fungal pathogen.

8. The method of claim 6 wherein the disease is bacterial spot.

9. The method of claim 6, wherein the plant is a member of the family Solanaceae.

10. The method of claim 6, wherein the plant is a member of the genus *Capsicum*.

11. The method of claim 6, wherein the plant is a member of the genus *Lycopersicon*.

12. The composite colloidal particle formulation of claim 1, wherein the volume of polyelectrolyte solution comprises polysaccharides, polypeptides, lectins, proteins, or antibodies or materials with affinity to microbes, viruses, seeds, or plant foliage.

13. The composite colloidal particle formulation of claim 12, wherein the polyelectrolyte solution is cationic.

* * * * *